INVENTOR.
KURT LEHOVEC
BY
Connolly and Hutz
HIS ATTORNEYS

Oct. 7, 1958 K. LEHOVEC 2,855,334

METHOD OF PREPARING SEMICONDUCTING CRYSTALS HAVING SYMMETRICAL JUNCTIONS

Filed Aug. 17, 1955 2 Sheets-Sheet 2

INVENTOR.
KURT LEHOVEC
BY
Connolly and Hutz
HIS ATTORNEYS

United States Patent Office 2,855,334 Patented Oct. 7, 1958

2,855,334

METHOD OF PREPARING SEMICONDUCTING CRYSTALS HAVING SYMMETRICAL JUNCTIONS

Kurt Lehovec, Williamstown, Mass., assignor to Sprague Electric Company, North Adams, Mass., a corporation of Massachusetts Application August 17, 1955, Serial No. 528,909

8 Claims. (Cl. 148—1.5)

The present invention relates to the preparation of electrical conductivity junctions of the type used in transistors and rectifiers.

As is well-known, such junctions are present in a crystal of semiconductive material where one portion of the crystal has n-type conductivity, characteristic of an excess of electrons, and an adjoining portion of the crystal has p-type conductivity, characteristic of a deficiency of electrons or an excess of "holes."

Among the objects of the present invention is the provision of new techniques for preparing the above junctions resulting in devices of improved electrical characteristics.

The above, as well as additional objects of the present invention, will be more clearly understood from the following description of several of its exemplifications, reference being made to the accompanying drawings wherein.

Figure 1:
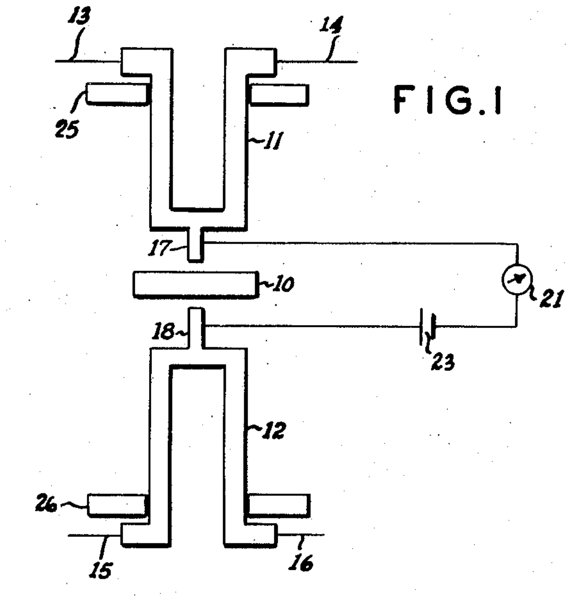
Fig. 1 is a schematic showing of the essential elements of one form of apparatus for carrying out the techniques of the present invention.

According to the present invention, semiconductor crystals of at least three regions of differing electrical characteristics can be prepared by application of surface melting techniques. Briefly, the steps of preparing such crystals consist of melting a portion of a germanium semiconductor crystal containing an impurity of one type, which determines the conductivity of said crystal, solidifying a discrete layer of said melt by the addition of silicon, doping the remainder of said melt with an impurity which will determine its conductivity and solidifying said melt.

To prepare a symmetrical multiple junction, that is, n-p-n or p-n-p, the crystal prior to melting must be doped with both n and p type impurities of different segregation coefficients. Segregation coefficient, $S_c$, is defined as the ratio of the concentration of the impurity in the solid phase, $C_s$, to the concentration in the melted phase, $C_m$, as a semiconductor crystal containing the impurity is solidified from the molten state. To produce the symmetrical multiple junction crystal several conditions must be met:

To produce an n-p-n-junction, use is made of a crystal slab of n-type conductivity containing both n-type and p-type impurities of concentrations $C_n$ and $C_p$, respectively. In order that the crystal slab is n-type, $C_n$ must be larger than $C_p$. When melting part of the slab and resolidifying a thin zone of it, the impurity concentrations in the thin zone will be: $C_n.(S_c \text{ of } n)$ and $$C_p.(S_c \text{ of } p)$$

respectively. In order that this thin slab is p-type, one must have:

$$C_n.(S_c \text{ of } n) < C_p.(S_c \text{ of } p)$$

In view of the previous conditions, $C_n > C_p$, this is possible only if $$(S_c \text{ of } n) < (S_c \text{ of } p)$$

Then the remaining part of the melt is doped with more n-type so that upon solidification the remainder of the melt has a major amount of n-type.

For use in rectifier devices, it is desirable to have a crystal with three zones of conductivity, the two outer zones of high conductivities of opposite type (p and n) and the inner sandwiched zone of low conductivity either n or p. Such a structure can be prepared conveniently from a crystal slab, having a high concentration, $C_n$, of impurities, of the n-type, and therefore a high conductivity of the n-type. By melting the crystal and resolidifying a thin section of the melt, a zone of impurity concentration, $C_n$ ($S_c$ of n) arises, which has a substantially lower conductivity than the end zone, since ($S_c$ of n) is small as compared to unity, for most impurities. The remaining part of the melt is then heavily doped with p-type impurities and solidified to give a high conductivity p-type end section.

The heating for surface melting of the semiconductor can be effected by engagement of the crystal surface with a heated object such as an electrically heated refractory solid. The engagement portion of the heated refractory solid can, if desired, be pressed against the surface of the semiconductor so that it forces its way into the semiconductor as the semiconductor melts. Alternatively, a very good heating arrangement uses a focussed beam of electrons or other electrically charged particles, or a concentrated light beam.

The recrystallization of a thin section of a melt, mentioned previously, can be made by either lowering the heat input into the melt (e. g. decreasing the heating temperature) or by using the following method, to be described in the case of a germanium melt, supported by a germanium crystal.

Dissolve a trace of silicon in the melt by adding silicon or a silicon alloy. A silicon-germanium alloy will recrystallize at the interface solid-germanium/liquid-germanium, owing to the higher solidification point of the silicon-germanium alloy than that of germanium. This use of silicon can also be combined with a simple doping operation instead of using the junction formation that depends upon the difference in impurity segregation rates.

Referring now to the drawings, Fig. 1 shows a semiconductor crystal 10, of germanium or silicon for example, supported between two heating elements 11, 12. Both faces of the crystal are exposed, and opposite each face is a tip 17, 18 having an engagement surface of a size suitable to provide the desired junction area. A tip-engagement area in the form of a circle having a diameter of about 50 mils or less is suitable.

Each tip 17, 18 is formed as an extension from a generally U-shaped electrical resistor body, the ends of which are connected to electrical conductors 13, 14 and 15, 16, respectively. Passage of electric current through these conductors will accordingly heat the elements 11, 12 to a temperature sufficiently high to cause the tip to melt the semiconductor at its engagement zone. The tips can be made of any refractory solid materials that do not introduce undesired impurities into the semiconductor. The elements 11, 12 themselves can be made from material, that is the same or different from that of the tips. For most purposes the elements 11, 12 can be made of a single piece of pressed carbon. Such a material with an effective cross-section corresponding to a circle with a diameter of 100 mils or so, will be readily heated to the desired high temperature by electric currents of about 20 to 50 amperes.

In the construction of Fig. 1, an ammeter 21 is connected between the tips 17 and 18 along with a source of current such as battery 23. When the tips are engaged with the crystal 10, an electrical circuit through the crystal and the meter is completed so that the meter will indicate a current that depends upon the electrical resistance of the crystal. As the semiconductor surface portions fuse, its electrical resistance decreases so that the current is an indication of the thickness of the remaining unmelted region between the tips.

The apparatus of Fig. 1 can be used with a semiconductor such as a germanium crystal about 10 to 30 mils thick having n-type electrical conductivity contributed by the presence of small amounts of an impurity such as arsenic or antimony. Such a germanium crystal is obtained by adding to the germanium a high concentration of n-type or donor type impurity such as arsenic along with a lower concentration of p-type impurity such as gallium. Inasmuch as an impurity such as arsenic shows a much lower segregation coefficient upon freezing of the molten material than gallium, gallium will be deposited in large amounts as the solidification commences forming a discrete p-layer. Continuing the solidification, the conductivity will change from p to n, not as an abrupt but rather gradual transition. To prepare the single junction crystal, the diffused type of latter grown n-region is removed by cutting away the surface until the p-region is reached. For an n-p-n crystal of abrupt junctions, after the initial solidification for the p-layer, doping of the remainder of the melt would be carried out with an n-impurity such as arsenic or antimony.

Where two such operations are carried out on opposite faces of the semiconductor crystal, two junctions will be simultaneously formed. By controlling the meltings on opposite faces so that they do not completely penetrate through the depth of the crystal, a predetermined spacing of 2 to 5 mils, for example, can be provided between the junctions. Junctions developed too close together can be moved farther apart by subjecting the final crystal to a high-temperature diffusion operation. Heating the crystal to a temperature of about 50 to 100° C. below its melting point for only about 10 or 15 minutes will be sufficient to cause the junctions to move farther apart by a distance of about 1 to 2 mils. This appears to be caused by the fact that the central zone of the symmetrical junction has a higher content of impurities than the end zones. The diffusion causes some of this excess impurity to fuse into the end zones, converting the adjacent sections of the end zones to the type of conductivity represented by the central zone.

The opposite effect, that is, the use of diffusion to bring two symmetrical junctions closer together, can also be obtained by a similar heat treatment where the end zones have higher impurity content than the central zone. Also the junction width can be varied by using impurities of differing diffusion constants, the more rapidly diffusing impurity determining the change, e. g. antimony has a higher diffusion constant in germanium than does indium.

One simple way of producing a close spacing between opposed junctions is to first carry out a melting that penetrates entirely through the depth of the crystal while noting the readings of the meter 21. After solidification the melting can be repeated, this time stopping at the meter reading corresponding to that obtained just prior to complete penetration. For the desired junction formation, cooling should be effected relatively rapidly, preferably over a period of not more than 10 seconds. Such rapid cooling is conveniently accomplished by rapidly withdrawing the heater element tips 17, 18 from the meter when cooling is to be initiated. It is also helpful to stop the flow of current through the heating elements. Slow cooling is preferably accomplished by merely reducing the flow of heating current in the heating element.

In accordance with the present invention, a crystal 10 of relatively large surface area can be used for making a plurality of sets of symmetrical junctions. In other words, one set of junctions can be prepared with one portion of the crystal, and then the crystal can be shifted with respect to the tips 17, 18, and another set of junctions prepared. This operation can be repeated until all the usable portions of the crystal have been provided with separate junctions. The final product can then be cut, as by grit blasting or electrolytic etching, into individual small pieces each containing one set of junctions. These individual portions can then be provided with electrodes and suitably encapsulated in any convenient manner so as to form a completed transistor.

Instead of using a resistance-measuring device such as meter 21, the tips 17, 18 can merely be provided with stops, such as indicated at 25, 26 so that the tips can be forcefully moved toward each other as far as the stops will permit. A suitable pressure will accordingly cause the tips to penetrate into the crystal as the surface portions melt, the inward motion being then terminated by the limiting action of the stops to provide a suitable spacing between the two junctions that are formed.

The apparatus of Fig. 1 can also be used with a doping procedure to apply an additional amount of the desired impurities in the molten portions. By way of example, the engagement faces of tips 17, 18 or the surfaces of the semiconductor crystal, can be coated with a film of antimony or other suitable n-type impurity, where the crystal has a p-type conductivity. Subsequent melting will dissolve the coating of n-type impurity and the crystal will accordingly become converted to n-type semiconductor on solidification.

Figure 2:
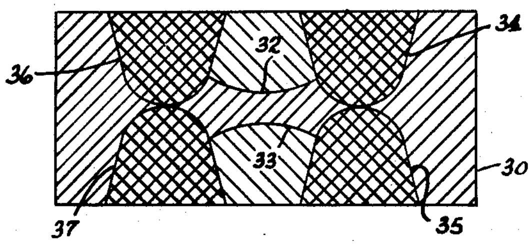

Fig. 2 is an enlarged view showing a single pair of junctions 32, 33 provided in a crystal portion 30. This structure can be used without change as by merely providing the electrical connections in the manner indicated above. However, for the best high-frequency response in the resulting transistor, it is desirable to use only those portions of the crystal in which the junctions 32, 33 are substantially equidistant from each other. To this end, grooves can be drilled through the crystal, as indicated at 34, 35, 36 and 37. The face of each crystal can have a plurality of individual grooves, or else a ring-shaped groove can be drilled by ultrasonic vibration of a die using a lubricated abrasive. A similar arrangement can be used for drilling the grooves by means of a high-pressure stream of water, for example, carrying abrasive particles such as silicon carbide or Alundum.

Figure 3:
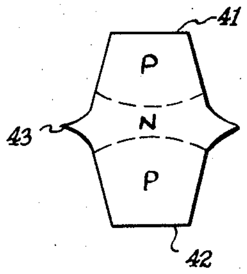
Figs. 2, 3 and 4 are sectional views showing stages in the preparation of the junction-containing material of the present invention.

Fig. 3 shows the junction-containing body formed after the grooves have cut completely through the crystal. This body has upper and lower zones having relatively small external surfaces 41, 42, and an intervening zone with an equatorial ridge 43 extending entirely around it. This construction is particularly suited for the application of electrodes to all three zones. The projecting character of the ridge 43 makes the connection of an electrode to it quite simple, even where the body is of very diminutive size.

Figure 4:
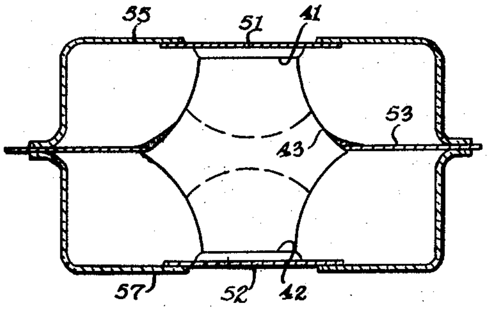

Fig. 4 shows one arrangement for the connection of electrodes. Discs 51, 52, of metal such as Kovar (an alloy consisting of 20% nickel, 17% cobalt, $\frac{2}{10}$% magnesium, all by weight, the balance iron) are soldered to the faces 41, 42, and an annulus 53 of similar metal is soldered to the ridge 43. Before soldering, the surfaces of the body to which the solder is to be adhered can be etched in the conventional manner, and an ordinary lead tin solder such as one containing 50% tin by weight, can be used. Glass shells 55, 57 can then be sealed between the ring 53 and the respective discs 51, 52 to provide a hermetically sealed construction. The glass should be a soft soda-lime glass, or any glass with similar thermal expansion characteristics, so that it forms a good seal against the Kovar.

Figures 5, 7, 8:
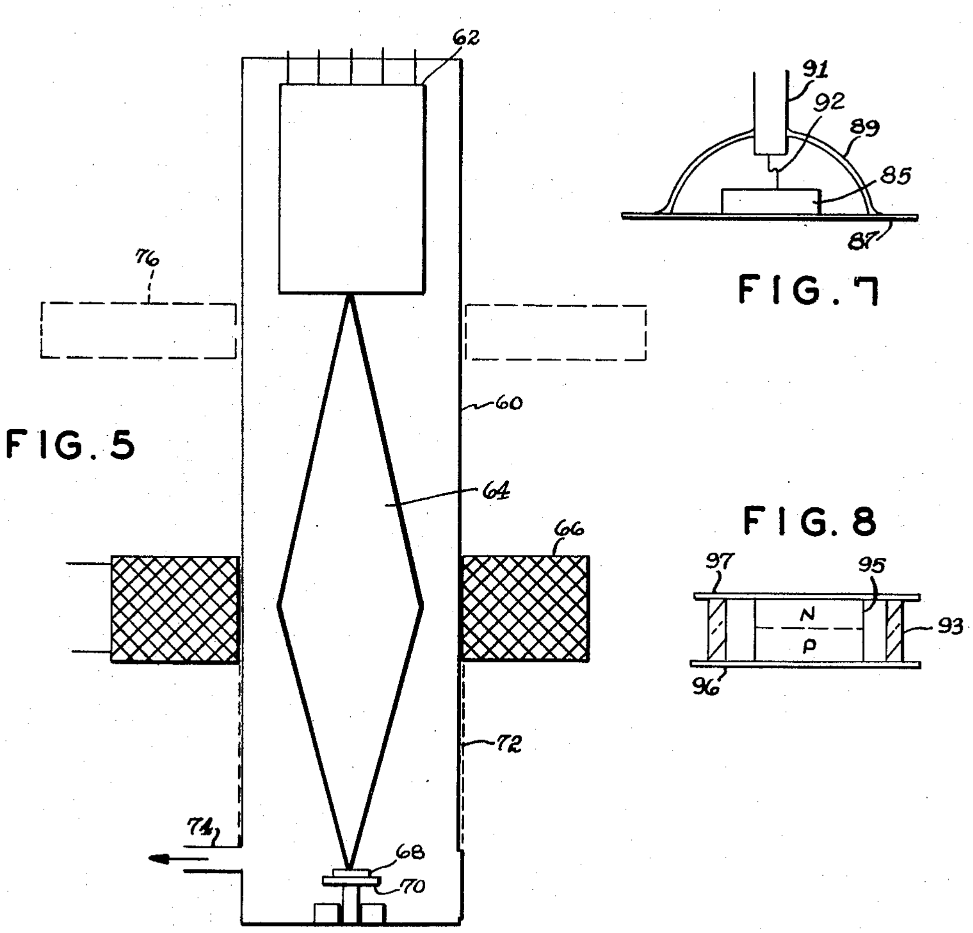
Fig. 5 is a view similar to Fig. 1 of a modified form of apparatus for carrying out the present invention.
Figs. 7 and 8 show additional forms of housing constructions for semiconductor devices pursuant to the present invention.

Fig. 5 shows another form of apparatus that can be used to effect the fusion of the present invention. The apparatus of Fig. 5 is essentially a housing 60 in which is mounted an electron gun 62 arranged to generate a beam of electron 64. A focussing device such as coil 66 is arranged to focus the beam upon a semiconductor crystal 68 suitably mounted in the container as by way of pedestal 70. An anode electrode such as electrically conductive coating 72 on the inside or outside of the housing 60 can be used to provide an electric field of sufficient intensity, 10,000 volts or more, for example, to propel the electrons in the beam in the desired manner. A tube 74 communicating with the inside of the housing is also provided so that the housing can be evacuated as by connecting it to a vacuum pump.

The apparatus of Fig. 5 is operated by first inserting the semiconductor crystal 68 in its proper position on pedestal 70. For this purpose the pedestal can be mounted in a socket as indicated, so that its position will be predetermined. The housing is then evacuated to a pressure of about 1/10 of a micron of mercury or less, and the electron beam then switched on. The focussing of the beam on the face of the semiconductor 68 will cause it to rapidly melt at the focussing point, where it is of sufficiently small area, that is less than about 50 microns in diameter. An electron beam corresponding to a current of about 10 milliamperes driven under a potential of 20,000 volts, will generally provide such melting in a few seconds. If the electron beam is to be projected before melting is desired, as for example, where the electron gun is to be heated up to operating temperature, the beam can be kept from striking the crystal 68 as by applying an electrostatic deflection field in the housing or else by defocussing it. The defocussing is readily accomplished by interrupting or changing the flow of current in focussing coil 56. In addition, the crystal 68 can be disconnected from the electron beam circuit so that it will not unduly attract the electrons of the beam. Where the crystal is kept permanently connected to the electron beam circuit, the anode 72 can be eliminated, if desired.

Inasmuch as the focussing action can be accomplished very accurately and the beam can be focussed within areas as little as 10 to 20 mils in width, the melting can be confined to correspondingly diminished surface portions. In addition, a plurality of such melting operations can be completed in closely adjacent portions of a single crystal as described in connection with Fig. 1. Between such adjacent meltings the crystal or the beam can be shifted in position, preferably without disturbing the evacuation of the housing. Shifting of the crystal can be readily arranged by having the pedestal made of magnetic material and applying a magnet externally of the casing to rotate or translate the pedestal, as desired. Alternatively, the beam can also be shifted as by a slight tilting of the focussing coil 56, or by a pair of deflection plates between which a deflecting potential is applied.

Inasmuch as the electron gun 62 normally generates appreciable quantities of ions in addition to electrons, all these ions can also contribute some heating effect. The apparatus of Fig. 5 can be further modified, if desired, by the application of an ion-focussing device such as the secondary coil 76. By focussing the ions on the same spot as the electrons, an appreciable increase in heating speed can be obtained. Although these ions need not be focussed, there will ordinarily be a heavy ion bombardment, particularly where the evacuation is not too complete.

The apparatus of Fig. 5, with or without the heating effect of the ions, can be made to produce localized melting in as little as 10 seconds or even less. Furthermore, when rapid cooling is desired, the interruption of the focussed beams will immediately stop all heating so that the cooling will be extremely rapid. Where the cooling rate is to be slowed down, it is only necessary to reduce the intensity of the beam current or beam voltage, or a slight defocussing can be made. Any two or all three of these controls can be applied together if desired.

Doping of the molten portion of the crystal can be effected with the apparatus of Fig. 5 by applying a coating film of a suitable dope impurity on the surface of the crystal, or to a relatively smaller degree, by introducing the impurities in the form of vapor within the housing 60. The action of the electron beam is such that it will ionize the introduced impurities and cause some of these ions to be projected against the crystal. This effect is best used where the ion beam is focussed on the melting zone.

A feature of the present invention is that where the melting can be carried out very rapidly, that is in a time of about 1 to 15 seconds, a symmetrical pair of junctions can be formed with only a single melting zone. For this type of operation it is convenient to start with a crystal having both donor and acceptor impurities with the donor impurities (antimony, for example) at an appreciably higher concentration and a lower segregation coefficient than the acceptor impurity. The melting of a zone and the rapid solidification will accordingly cause a limited p-type conductivity region to be produced in the manner explained above. In accordance with the present invention, however, the rapid melting may be accomplished along with an additional doping with further amounts of n-type impurity. The added impurity has not the time to diffuse fully into the entire melt during the short time period in which the melting is accomplished. The prompt solidification, that is within a period of 5 to 10 seconds, will therefore trap the added impurities in the external section of the melt so that this section will be sharply converted back to n-type conductivity. The final result will be two n-type zones separated by a p-type zone, providing an n-p-n junction combination characterized by sharply defined junctions rather than the diffused type.

Figure 6:
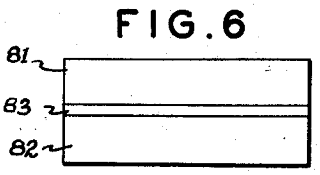
Fig. 6 is a side view of a modified n-p junction that can be made in accordance with the present invention.

The use of the invention is also effective to provide junctions in which two low resistivity zones of opposite conductivity are separated by a third zone of high resistivity. Fig. 6 shows such a construction having an n-type layer 81, a p-type layer 82, both of which layers have a low resistivity of the order of 0.01 ohm centimeters. Between layers 81, 82 is a third layer 83 which can have a resistivity of up to 1000 that of layers 81, 82, and can have either n or p conductivity.

The construction of Fig. 6 is readily made by starting with a crystal of p-type conductivity of low resistivity, e. g. indium alloyed with germanium to a resistivity of about .01 ohm-centimeter. The surface of the crystal is then melted and a thin layer of it resolidified. The melt is thereafter heavily doped with an n-type impurity as phosphorous to realize the low resistance of the n-type end layer. The resistivity of the thin middle layer of width not less than 0.5 mil and not greater than 20 mils will approximate the reciprocal of the segregation coefficient for the acceptor impurity (which is .001 for indium) times the resistivity of the original p-conductivity crystal, e. g. $0.01/(0.001)=10$ ohm-centimeters. To produce the $n\text{-}n^{+}\text{-}p$ junction merely reverse the above process starting with an n-type germanium crystal, antimony impurity, and dope after melting and solidification of a discrete layer with a p-impurity as gallium.

The construction of Fig. 6 will readily provide high blocking potentials for inverse current flow, and as much as 50 to 100 volts will be necessary to cause an appreciable flow of current in the blocking direction. At the same time, the relatively thin character of zone 83, about 1 to 5 mils, will keep the series resistance of the composite crystal low so as not to dissipate excessive energy in the crystal thus increasing its usability.

An alternate technique for obtaining the desired melting is the use of a stream of heated inert gas such as helium or nitrogen directed against the desired zone, and using a conduit with a very small discharge outlet. Inasmuch as the gas has a very small specific heat, it is advisable to heat the entire crystal to very close to the melting point and then to use the gas stream for the desired localized melting effect. Even then the gas stream should be sufficiently rapid to supply heat faster than it can be dissipated by the crystal. A flow rate of at least about $\frac{1}{10}$ liter per second should be used where the crystal is separately heated to within about 100° C. of its melting point. The discharge gases should also be heated to at least 100 to 200° C. above the melting point of the crystal, as by means of an electric heater incorporated in the discharge conduit. Although a stream of gas is not as convenient to use, and the melting operation may take a considerable length of time, the gas stream is a more convenient path by which to introduce doping impurities. Such doping distributes the impurities evenly throughout the melt.

In some cases it is desirable to produce a limited but finite intermediate layer of opposite conductivity to that of the bulk of the crystal by surface melting techniques without variation of the heating and cooling controls. This can be accomplished in accordance with the present invention when the melt is essentially germanium by adding silicon to the melt. The addition of as little as 1 to 5% silicon based on the weight of the melt will produce an alloy having a higher melting point than the germanium. Upon this addition the interface of the melt-solid will shift, freezing a finite layer of the alloy, even though the surface melting conditions remain constant. With an original n-type crystal containing appropriate amounts of n and p impurities (that is within the limits previously set forth) the region solidified upon the addition of the silicon will be a p-region with a sharply defined junction. The residual melt can be heavily doped with an n-type impurity to produce an n-p-n crystal of sharply defined junctions. The silicon-germanium alloy also can be used for other applications including graded seal junctions and bonding silicon to germanium.

A convenient way of adding the desired amount of silicon is by means of the hot gas jet described above. Finely divided (300 mesh, for example) silicon powder is merely introduced into the jet so that it is swept along and projected into the melt.

According to a further aspect of the present invention, germanium crystals, before or after being provided with junctions, can be readily secured to a support such as a molybdenum strip or foil. By placing the germanium crystal on a molybdenum foil about ½ to 5 mils thick, for example, can be heated by an electric current passed through the molybdenum to a temperature high enough to melt the surface of the germanium that contacts it. A current of about 20 amperes is usually needed, depending upon the particular dimensions of the molybdenum. As soon as the molybdenum has reached a temperature somewhat above red heat, the heating can be stopped before the melting has gone too far, and the assembly permitted to cool. It will then be found that the germanium is securely welded to the molybdenum. Although this can be accomplished without pressing the germanium against the molybdenum, a small amount of pressure will help assure uniform results.

Fig. 7 shows a hermetically sealed germanium crystal 85 fused to a molybdenum foil 87, and enclosed in a ceramic shell 89 which is fused to the molybdenum. The shell 89 also holds an electrode lead 91 which projects through it and on its internal end carries a contact 92 which engages the crystal. The ceramic shell can be made of ordinary soft or soda-lime glass or porcelain, preferably glazed at least on its outer face, or it can be made of low alkali glasses such as those consisting essentially of 70 to 90% silica, and the remainder alkali earth oxides and alkali metal oxides. Inasmuch as soda-lime glass has an appreciably different coefficient of thermal expansion as compared with molybdenum, it is desirable to make the molybdenum foil as thin as possible in order to improve the quality of the seal. On the other hand, porcelain and low alkali glasses, including borosilicate glasses such as Pyrex glass, have thermal coefficients appreciably closer to the molybdenum and provide a better seal. Electrode lead 91 can be either made of molybdenum, preferably also in the form of a thin foil, or of a metal like platinum, tungsten or Kovar, that provides a good seal in the ceramic shell.

Fig. 8 is a modified construction in which a tube 93 of ceramic surrounds a crystal 95, and has its ends sealed to molybdenum sheets or foils 96, 97, which are also welded to the face of the crystal. This construction can be readily made by simultaneously welding and sealing the respective foils to both the ceramic tube and the crystal face. If desired, particularly where the ceramic is likely to soften and collapse before the welding is completed, the welding can be effected as a preliminary step without permitting the ceramic to touch the foil. Thus, the foil 96 can be first welded to one face of the crystal, after which the tube 93 is slipped over the crystal and then sealed to the same foil. Foil 97 can be welded to the face of the crystal while the margins of the foil are bent away from and do not contact the tube. After the second weld is completed, the foil 97 is brought against the open end of the tube and sealed in place by a low temperature treatment. As indicated, the crystal 95 can have a p-n junction, and foils 96, 97 can be used as electrode connections to its respective zones.

In the above constructions, wherever p- and n-type conductivities appear they can be interchanged. However, where solidification segregation rates are concerned, specific types of impurities are required in order to obtain the desired results.

As many apparently widely different embodiments of the invention may be made without departing from the spirit and scope hereof, it is to be understood the invention is not limited to the specific embodiments hereof except as defined in the appended claims.

What is claimed is:

1. A method for preparing a semiconducting crystals of at least three regions having differing electrical characteristics, said method including the steps of melting a surface portion of a germanium crystal having an inpurity present which determines the conductivity of said crystal, solidifying a discrete layer of said melt by the addition of silicon, doping the remainder of said melt with an impurity which will determine its conductivity, and solidifying said melt.

2. The combination of claim 1 in which opposed surfaces of the crystal are simultaneously melted and solidified to produce a symmetrical junction assembly.

3. The combination of claim 1 in which the crystal is separately heated to within 100° C. of its melting point, the surface portion is melted by means of a jet of heated inert gas, and the gas flow is at least 0.1 liter per second.

4. A method for preparing a semiconductor crystal containing at least three sections differing as to their individual electrical characteristics, said method including the steps of partially melting by means of a jet of heated inert gas a germanium semiconductor crystal having n-type and p-type impurities of substantially different segregation coefficients, the type with the smaller segregation coefficient being present in a concentration that determines the conductivity of the crystal, solidifying a part of said melt by the addition of silicon, doping the remaining melt with an impurity and finally solidifying the remainder of said melt.

5. A method for preparing symmetrical junctions in a semiconductor crystal, said method including the steps of providing a germanium semiconductor crystal having n-type and p-type impurities of different segregation coefficients, and the type with the lower segregation coefficient being present in a concentration that determines the conductivity type of the crystal, melting a surface portion of the crystal, adding silicon to the molten portion, doping the melt with additional impurities of the same conductivity type as the one having the lower segregation coefficient to more than compensate for the lower segregation coefficient, and rapidly freezing the melt before the additional impurities have a chance to diffuse through the entire depth of the melt.

6. In the method of making a fused junction in a germanium crystal, the steps of melting a surface portion of a germanium crystal having one type of electrical conductivity, adding some silicon to the molten portion and then causing the molten portion to solidify in a form having the opposite type of electrical conductivity.

7. A method for preparing a semiconductor device having a symmetrical junction, said method including the steps of melting a portion of a germanium semiconductor crystal having an impurity present which determines the conductivity of said crystal, solidifying a discrete layer of said melt, doping the remainder of said melt with an impurity, which will determine its conductivity, solidifying the melt, removing portions of the crystal to expose an equatorial ridge of said discrete layer, applying an electrode to said ridge, and encasing the crystal.

8. A semiconductor device having symmetrical junctions comprising a germanium crystal having upper and lower zones of one conductivity and an intervening zone of the opposite conductivity, the upper and lower zones having small surfaces and the intervening zone having an equatorial ridge, and electrodes attached to said surfaces and said ridge.

References Cited in the file of this patent

UNITED STATES PATENTS

| | | |
|---|---|---|
| 2,560,594 | Pearson | July 17, 1951 |
| 2,739,088 | Pfann | Mar. 20, 1956 |

FOREIGN PATENTS

| | | |
|---|---|---|
| 525,774 | Belgium | Feb. 15, 1954 |